(12) United States Patent
Yumoto

(10) Patent No.: US 8,393,383 B2
(45) Date of Patent: Mar. 12, 2013

(54) HOT WATER GENERATOR

(75) Inventor: Hideaki Yumoto, Hyogo-ken (JP)

(73) Assignee: TLV Co., Ltd., Hyogo-ken (JP)

( * ) Notice: Subject to any disclaimer, the term of this patent is extended or adjusted under 35 U.S.C. 154(b) by 691 days.

(21) Appl. No.: 12/383,233

(22) Filed: Mar. 19, 2009

(65) Prior Publication Data

US 2009/0308580 A1 Dec. 17, 2009

(30) Foreign Application Priority Data

Jun. 13, 2008 (JP) ................................ 2008-155893

(51) Int. Cl.
*F24H 1/10* (2006.01)
(52) U.S. Cl. ........................................ 165/108; 165/132
(58) Field of Classification Search .................. 165/108, 165/132
See application file for complete search history.

(56) References Cited

U.S. PATENT DOCUMENTS

| | | | | | |
|---|---|---|---|---|---|
| 2,296,325 | A | * | 9/1942 | Bak | 236/18 |
| 2,323,474 | A | * | 7/1943 | Kraft | 196/138 |
| 3,276,517 | A | * | 10/1966 | Lowe | 165/299 |
| 3,666,003 | A | * | 5/1972 | Clark et al. | 165/299 |
| 3,688,839 | A | * | 9/1972 | Kirschner et al. | 165/108 |
| 3,766,974 | A | * | 10/1973 | Kirschner | 165/299 |
| 4,046,189 | A | * | 9/1977 | Clark, Jr. | 165/299 |
| 4,278,069 | A | * | 7/1981 | Clark, Jr. | 122/14.1 |
| 2004/0154786 | A1 | * | 8/2004 | Lach | 165/110 |

FOREIGN PATENT DOCUMENTS

JP 2002-130821 5/2002

* cited by examiner

*Primary Examiner* — Allen Flanigan
(74) *Attorney, Agent, or Firm* — Kenyon & Kenyon LLP

(57) ABSTRACT

A hot water generator which has a high ability to prevent the hot water temperature from rising above a preset temperature when withdrawal of hot water is stopped. A hot water withdrawal pipe 5 of a heat exchanger 1 and a cold water intake pipe 4 thereof are connected through a circulating pipe 40 having a circulating pump 39. A cold water reservoir 42 is provided in the heat exchanger 1 on its cold water intake pipe 4 side. When withdrawal of hot water is stopped, the circulating pump 39 forces hot water in the heat exchanger 1 to circulate through the cold water reservoir 42, cold water intake pipe 4, circulating pipe 40 and hot water withdrawal pipe 5 back to the heat exchanger 1 or the circulating pump 39 forces hot water in the heat exchanger 1 to circulate through the hot water withdrawal pipe 5, circulating pipe 40, cold water intake pipe 4 and cold water reservoir 42 back to the heat exchanger 1. The temperature of circulating hot water is lowered by the cold water reservoir 42 so that the ability to prevent the hot water temperature from rising above a preset temperature is enhanced.

1 Claim, 1 Drawing Sheet

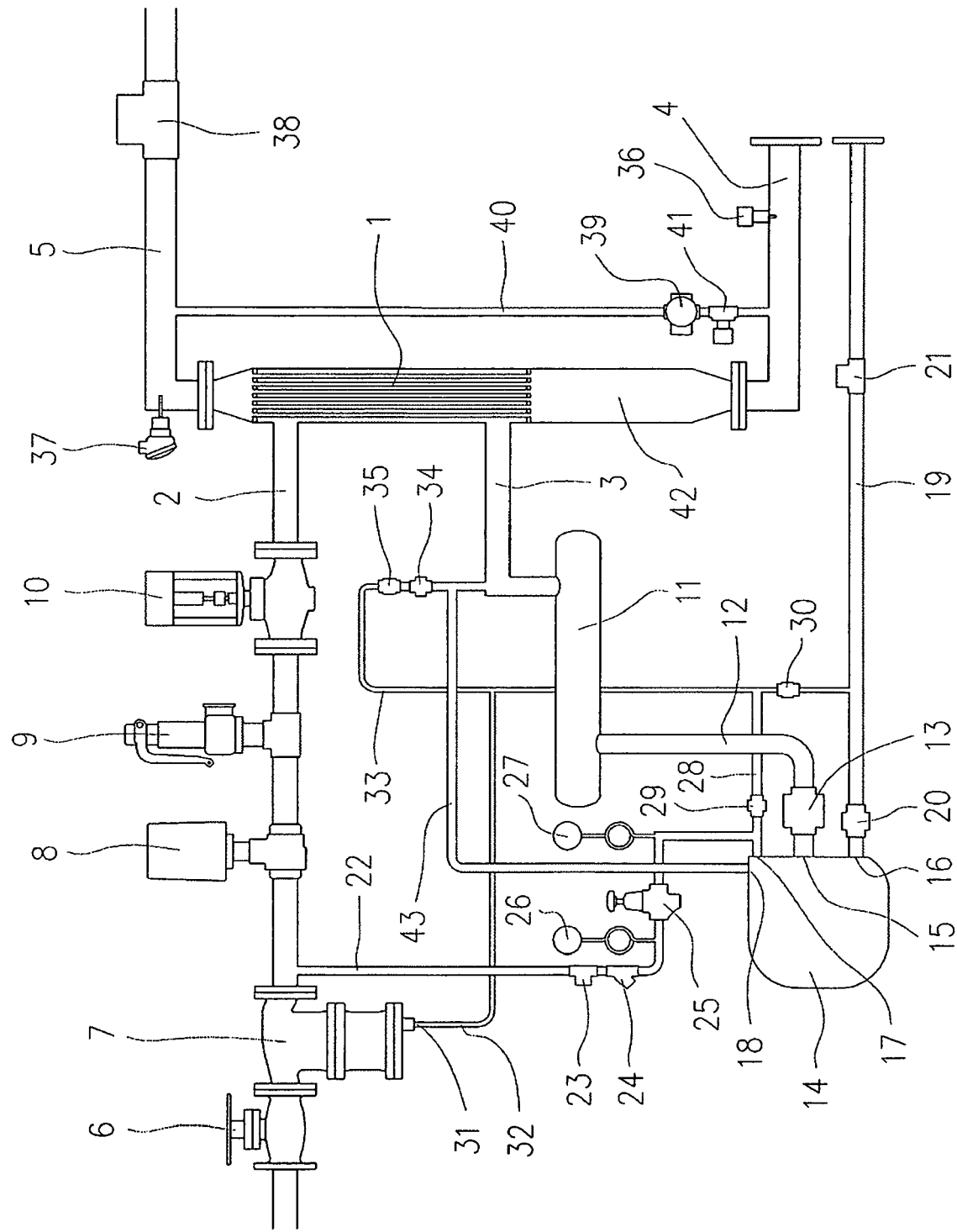

HOT WATER GENERATOR

TECHNICAL FIELD

The present invention relates to hot water generators which generate hot water by heating cold water with steam heat and, more particularly, to a hot water generator which prevents hot water temperature from rising above a preset temperature when withdrawal of hot water is stopped.

BACKGROUND ART

A conventional hot water generator is disclosed in JP-A No. 2002-130821. In this device, the hot water withdrawal pipe and cold water intake pipe of a heat exchanger are connected through a circulating pipe having a circulating pump and when withdrawal of hot water is stopped, the circulating pump forces hot water in the heat exchanger to circulate through the hot water withdrawal pipe, circulating pipe and cold water intake pipe back to the heat exchanger. When withdrawal of hot water is stopped, the circulating pump forces hot water in the heat exchanger to circulate through the hot water withdrawal pipe, circulating pipe and cold water intake pipe back to the heat exchanger to prevent hot water from staying in the heat exchanger so that hot water does not rise above a preset temperature due to remaining steam in the heat exchanger.

However, the above conventional hot water generator has a drawback that when withdrawal of hot water is stopped, hot water in the heat exchanger is just forced to circulate through the hot water withdrawal pipe, circulating pipe and cold water intake pipe back to the heat exchanger by the circulating pump and thus the ability to prevent the hot water temperature from rising above a preset temperature is low and when withdrawal of hot water is restarted, a relatively high temperature water above the preset temperature may be withdrawn.

RELATED ART DOCUMENT

Patent Document

Patent Document 1: JP-A No. 2002-130821

SUMMARY OF THE INVENTION

Problem to be Solved by the Invention

The problem to be solved by the invention is to provide a hot water generator which has a high ability to prevent the hot water temperature from rising above a preset temperature when withdrawal of hot water is stopped.

Means for Solving the Problem

The hot water generator according to the present invention is characterized in that a hot water withdrawal pipe of a heat exchanger and a cold water intake pipe thereof are connected through a circulating pipe having a circulating pump; a cold water reservoir is provided in the heat exchanger on its cold water intake pipe side; when withdrawal of hot water is stopped, the circulating pump forces hot water in the heat exchanger to circulate through the cold water reservoir, the cold water intake pipe, the circulating pipe and the hot water withdrawal pipe back to the heat exchanger or the circulating pump forces hot water in the heat exchanger to circulate through the hot water withdrawal pipe, the circulating pipe, the cold water intake pipe and the cold water reservoir back to the heat exchanger.

Effect of the Invention

In the hot water generator according to the present invention, when withdrawal of hot water is stopped, the circulating pump forces hot water in the heat exchanger to circulate through the cold water reservoir, the cold water intake pipe, the circulating pipe and the hot water withdrawal pipe back to the heat exchanger or the circulating pump forces hot water in the heat exchanger to circulate through the hot water withdrawal pipe, the circulating pipe, the cold water intake pipe and the cold water reservoir back to the heat exchanger. Therefore, it produces an excellent effect that the temperature of circulating hot water is lowered by the cold water reservoir, thereby enhancing the ability to prevent the hot water temperature from rising above the preset temperature.

BRIEF DESCRIPTION OF A DRAWING

FIG. 1 is a diagram showing the configuration of a hot water generator according to an embodiment of the present invention.

MODE FOR CARRYING OUT THE INVENTION

An embodiment of the present invention as a concrete example of the above technique will be described (see FIG. 1). A corrugate tube heat exchanger 1 is connected with a steam supply pipe 2, a drain discharge pipe 3, a cold water intake pipe 4 and a hot water withdrawal pipe 5. From upstream, an opening/closing valve 6, a gas-liquid separator 7, an electric valve 8, a safety valve 9, and a control valve 10 are attached to the steam supply pipe 2. A header tank 11 is connected to the drain discharge pipe 3. The header tank 11 temporarily stores drain discharged from the heat exchanger 1. The header tank 11 is connected to a drain inflow pipe 12 and a return check valve 13 and a drain pressure feed pump 14 are attached to the drain inflow pipe 12 from upstream. The return check valve 13 allows a fluid to flow from the header tank 11 to the drain pressure feed pump 14 and prevents its flow in the opposite direction.

The drain pressure feed pump 14 has a drain inflow port 15, a drain pressure feed port 16, a steam intake port 17, and a steam discharge port 18. The drain inflow pipe 12 is connected through the return check valve 13 to the drain inflow port 15. A drain pressure feed pipe 19 is connected to the drain pressure feed port 16, and from upstream a return check valve 20 and an opening/closing valve 21 are attached to the drain pressure feed pipe 19. The return check valve 20 allows a fluid to flow from the drain pressure feed pump 14 to the opening/closing valve 21 and prevents its flow in the opposite direction. A steam intake pipe 22 diverging from the steam supply pipe 2 is connected to the steam intake port 17 and from upstream an opening/closing valve 23, a strainer 24, and a pressure reducing valve 25 are connected to the steam intake pipe 22. Pressure gauges 26 and 27 are provided before and after the pressure reducing valve 25 of the steam intake pipe 22. A drain removal pipe 28 diverging from the joint of the steam intake pipe 22 to the steam intake port 17 is connected to the drain pressure feed pipe 19 and from upstream a steam trap 29 and a return check valve 30 are attached to the drain removal pipe 28. The steam trap 29 automatically discharges drain to a return check valve 30 downstream without discharge of steam. The return check valve 30 allows a fluid to flow from the steam trap 29 to the drain pressure feed pipe 19 and prevents its flow in the opposite direction. The steam discharge port 18 is connected to the upstream side of an exhaust valve 34 of an initial air discharge pipe 33 (described below) through an exhaust pipe 43.

When a float (not shown) inside the drain pressure feed pump 14 is in a low position, the steam intake port 17 is closed and the steam discharge port 18 is opened to let the drain accumulated in the header tank 11 flow down through the drain inflow port 15 into the pump through the return check valve 13. When drain is accumulated in the pump and the float (not shown) goes up to a prescribed position, the steam discharge port 18 is closed and the steam intake port 17 is opened to let the steam in the steam intake pipe 22 flow through the steam intake port 17 into the pump so that the drain accumulated in the pump is pressure-fed from the drain pressure feed port 16 through the drain pressure feed pipe 19 to a desired destination. When the liquid level in the pump becomes low, again the steam intake port 17 is closed and the steam discharge port 18 is opened to let drain flow through the drain inflow port 15 into the pump. The drain pressure feed pump 14 pressure-feeds drain from the header tank 11 to the desired destination by repeating this operation cycle.

The drain discharge port 31 of the gas-liquid separator 7 is connected between the steam trap 29 of the drain removal pipe 28 and the return check valve 30 by a drain removal pipe 32. The initial air discharge pipe 33 diverging from the drain discharge pipe 3 is connected to the drain removal pipe 32. The exhaust valve 34 and a return check valve 35 are attached to the initial air discharge pipe 33. The exhaust valve 34 discharges initial air in the header tank 11. The return check valve 35 allows a fluid to flow from the exhaust valve 34 to the drain removal pipe 32 and prevents its flow in the opposite direction. A flow switch 36 is provided on the cold water intake pipe 4. A temperature sensor 37 is installed on the hot water withdrawal pipe 5 and an opening/closing valve 38 is installed on the hot water user side.

The hot water withdrawal pipe 5 and cold water intake pipe 4 are connected to the circulating pipe 40 having the circulating pump 39. An electromagnetic valve 41 is attached between the circulating pump 39 and the cold water intake pipe 4 upstream thereof. The cold water reservoir 42 is located on the cold water intake 4 side of the heat exchanger 1. The cold water reservoir 42 may be part of the heat exchanger 1 or a separate unit located between the heat exchanger 1 and the cold water intake pipe 4. As the electromagnetic valve 41 opens and the circulating pump 39 starts running, the circulating pump 39 forces hot water in the heat exchanger 1 to circulate through the cold water reservoir 42, cold water intake pipe 4, circulating pipe 40 and hot water withdrawal pipe 5 back to the heat exchanger 1.

When the hot water temperature detected by the temperature sensor 37 is above a preset temperature, the degree of opening of the control valve 10 is decreased; when it is below the preset temperature, the degree of opening is increased. The electromagnetic valve 8 closes if the hot water temperature detected by the temperature sensor 37 is higher by a prescribed extent than the preset temperature because it is out of the control range of the control valve 10 or the control valve 10 is out of order. Also when withdrawal of hot water is stopped, the electromagnetic valve 8 closes if the hot water temperature detected by the temperature sensor 37 is higher by a prescribed extent than the preset temperature or a flow switch 36 no longer detects any flow of cold water. When withdrawal of hot water is stopped, the electromagnetic valve 41 is opened and the circulating pump 39 is activated if the hot water temperature detected by the temperature sensor 37 is higher by a prescribed extent than the preset temperature or the flow switch 36 no longer detects any cold water flow. Consequently, the circulating pump 39 forces hot water in the heat exchanger 1 to circulate through the cold water reservoir 42, cold water intake pipe 4, circulating pipe 40 and hot water withdrawal pipe 5 back to the heat exchanger 1, thereby preventing hot water from staying in the heat exchanger 1 and preventing the hot water temperature from rising above the preset temperature due to remaining steam in the heat exchanger 1. The temperature of circulating hot water is lowered by the cold water reservoir 42, so that the ability to prevent the hot water temperature from rising above the preset temperature is enhanced. When withdrawal of hot water is restarted, it is possible to withdraw hot water with a relatively low temperature which circulates from the circulating pipe 40 toward the hot water withdrawal pipe 5 preferentially.

In the above embodiment, the circulating pump 39 forces hot water in the heat exchanger 1 to circulate through the cold water reservoir 42, cold water intake pipe 4, circulating pipe 40 and hot water withdrawal pipe 5 back to the heat exchanger 1. Instead, the electromagnetic valve 41 may be installed between the circulating pump 39 of the circulating pipe 40 and the hot water withdrawal pipe 5 upstream thereof so that when the electromagnetic valve 41 opens and the circulating pump 39 starts running, the circulating pump 39 forces hot water in the heat exchanger 1 to circulate through the hot water withdrawal pipe 5, circulating pipe 40, cold water intake pipe 4 and cold water reservoir 42 back to the heat exchanger 1.

DESCRIPTION OF REFERENCE NUMERALS

1 Corrugate tube heat exchanger
2 Steam supply pipe
3 Drain discharge pipe
4 Cold water intake pipe
5 Hot water withdrawal pipe
6 Opening/closing valve
7 Gas-liquid separator
8 Electric valve
9 Safety valve
10 Control valve
11 Header tank
12 Drain inflow pipe
13 Return check valve
14 Drain pressure feed pump
15 Drain inflow port
16 Drain pressure feed port
17 Steam intake port
18 Steam discharge port
19 Drain pressure feed pipe
20 Return check valve
21 Opening/closing valve
22 Steam intake pipe
23 Opening/closing valve
24 Strainer
25 Pressure reducing valve
26 Pressure gauge
27 Pressure gauge
28 Drain removal pipe
29 Steam strap
30 Return check valve
31 Drain discharge port
32 Drain removal pipe
33 Initial air discharge pipe
34 Exhaust valve
35 Return check valve 36 Flow switch
37 Temperature sensor
38 Opening/closing valve
39 Circulating pump
40 Circulating pipe
41 Electromagnetic valve
42 Cold water reservoir
43 Exhaust pipe

The invention claimed is:

1. A hot water generator comprising:
a hot water withdrawal pipe of a heat exchanger and a cold water intake pipe thereof are connected through a circulating pipe having a circulating pump;
a cold water reservoir is provided entirely between the heat exchanger and the cold water intake pipe;
when withdrawal of hot water is stopped, the circulating pump forces hot water in the heat exchanger to circulate through the cold water reservoir, the cold water intake pipe, the circulating pipe and the hot water withdrawal pipe back to the heat exchanger or the circulating pump forces hot water in the heat exchanger to circulate through the hot water withdrawal pipe, the circulating pipe, the cold water intake pipe and the cold water reservoir back to the heat exchanger.

* * * * *